United States Patent
Gerlach et al.

(10) Patent No.: US 9,205,592 B2
(45) Date of Patent: Dec. 8, 2015

(54) PROCESS FOR THE MANUFACTURE OF AN ARTICLE COMPRIMISING A RECESS

(75) Inventors: Christian Gerhard Friedrich Gerlach, Brussels (BE); Widalys Luz Desoto-Burt, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 770 days.

(21) Appl. No.: 13/350,374

(22) Filed: Jan. 13, 2012

(65) Prior Publication Data
US 2013/0183468 A1   Jul. 18, 2013

(51) Int. Cl.
| | |
|---|---|
| *B29C 49/58* | (2006.01) |
| *B29C 49/04* | (2006.01) |
| *B29C 49/06* | (2006.01) |
| *B29L 31/00* | (2006.01) |
| *B29C 49/18* | (2006.01) |
| *B29C 49/54* | (2006.01) |

(52) U.S. Cl.
CPC .................. *B29C 49/58* (2013.01); *B29C 49/04* (2013.01); *B29C 49/06* (2013.01); *B29C 49/185* (2013.01); *B29C 2049/543* (2013.01); *B29C 2049/546* (2013.01); *B29L 2031/7158* (2013.01); *Y10T 428/1397* (2015.01)

(58) Field of Classification Search
CPC ........ B29C 49/58; B29C 49/04; B29C 49/06; B29C 49/185; B29C 2049/543; B29C 2049/546; Y10T 428/1397; B29L 2031/7158
See application file for complete search history.

(56) References Cited

U.S. PATENT DOCUMENTS

| | | | |
|---|---|---|---|
| 5,505,612 | A | 4/1996 | Mero et al. |
| 5,921,416 | A | 7/1999 | Uehara |
| 6,074,596 | A | 6/2000 | Jacquet |
| 6,357,625 | B2 | 3/2002 | Kimble et al. |
| D573,469 | S | 7/2008 | Lamb et al. |
| 2005/0170035 | A1 | 8/2005 | Chen |
| 2012/0181272 | A1 | 7/2012 | Desoto-Burt |
| 2012/0181278 | A1 | 7/2012 | Pagan |
| 2012/0181292 | A1 | 7/2012 | Desoto-Burt |
| 2012/9018120 | | 7/2012 | Desoto-Burt |

OTHER PUBLICATIONS

The Wiley Encyclopedia of Packaging Technology, Edited by Brody, A.L. and Marsh, K.S., John Wiley & Sons, Inc., 2nd Edition, 1997, pp. 914 to 921.
International Search Report; PCT/US2012/020869; Mailing Date Jun. 8, 2012; 8 pages.
International Search Report; PCT/US2012/020869; Mailing Date Aug. 20, 2012; 16 pages.
International Search Report; PCT/US2012/020693; Mailing Date Jun. 8, 2012; 8 pages.
International Search Report; PCT/US2012/020693; Mailing Date Aug. 20, 2012; 17 pages.
International Search Report; PCT/US2012/021203; Mailing Date Jun. 8, 2012; 9 pages.
International Search Report; PCT/US2012/021203; Mailing Date Aug. 20, 2012; 16 pages.
U.S. Appl. No. 13/391,488, filed Jan. 10, 2012, Christian Gerhard Freidrich Gerlach.
U.S. Appl. No. 13/350,436, filed Jan. 13, 2012, Christian Gerhard Freidrich Gerlach.

*Primary Examiner* — Michael C Miggins
(74) *Attorney, Agent, or Firm* — Linda M. Sivik

(57) ABSTRACT

The present invention relates to a process for blowing an article with at least one recess.

14 Claims, 3 Drawing Sheets

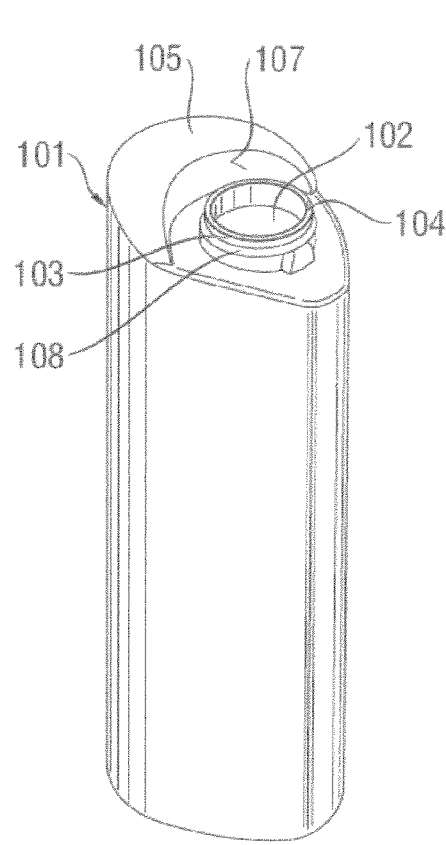
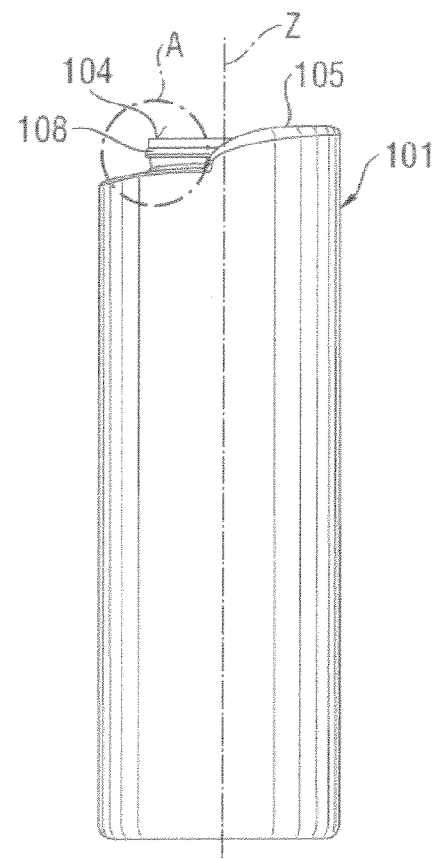
Fig. 1A
Fig. 1B
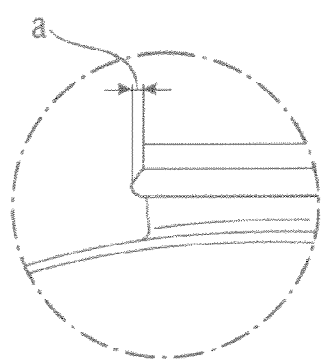
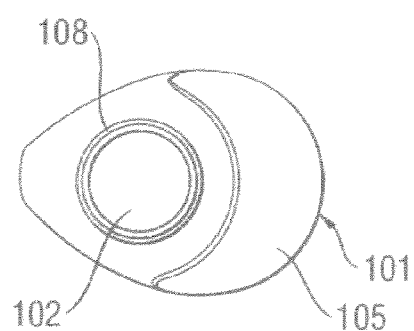
Fig. 1C
Fig. 1D

PROCESS FOR THE MANUFACTURE OF AN ARTICLE COMPRIMISING A RECESS

FIELD OF INVENTION

The present invention relates to a process for blow-molding an article comprising at least one recess, and wherein said recess is located proximal to an opening portion of the article for association of a closure to said article. In particular, the present invention relates to forming of such recesses in such a way that no portion of the mold remains trapped by the undercuts formed proximal to said recess.

BACKGROUND OF THE INVENTION

The formation of a recess in a blow molded article, wherein said recess is located proximal to an opening portion of the article, is highly desirable as it enables the integration of the design of the closure with the design of the article. This integration in turn allows the manufacturer to form consumer pleasing designs whilst making closure functioning intuitive to the user. More desirable still is the integration of the closure with the article such that the closure can be miniaturized. This miniaturization of the closure is desired as it reduces the weight of the closure thus reducing the amount of raw material and energy consumed. A further advantage is that stability of the article may be attained in both top side up and inverted positions, this thanks to the flat surface generated by article and closure.

The manufacture of a blown article comprising at least one recess, wherein said recess is located proximal to an opening portion of the article, is technically challenging. This is because the formation of a recessed neck requires the article to form a shoulder(s) above the top portion of the neck portion. This is technically challenging because the material flow to form such shoulders would be against the natural material flow in blow molding. The natural material flow in blow molding is from the neck of the parison or preform towards the base of the article guided by a pressure build up that expands the walls of said article being formed to the shape of the mold cavity. Moving material against that natural flow direction requires careful design of the parison or preform, and careful definition of the blowing process.

Another challenge is that, such shoulder being above the neck, forms undercuts during the blow molding process which prevents the unmolding the finished article when using known unmolding processes. This is particularly true if such shoulder presents multiple curves on its surface. One cannot unmold an article with such undercuts without damaging the article.

The art contains a number of attempts to solve the inherent problems of forming recessed blow molded articles.

One approach has been to form containers having recesses that do not generate undercuts, such as those described in USD573469 (The Procter & Gamble Company). Such recesses allow unmolding with a simple "straight-pull" action from a standard mold. However, such recessed geometries that can be unmolded with a straight pull in a blow mold are highly restrictive in terms of design of the recess geometry that may be obtained. This in turn limits the degree of integration of the closure with the blown article and thus fails to attain the above stated benefits.

Another approach has been to blow mold the article in a mold cavity followed by a second step of trimming (or deflashing) the excess plastic in order to finish the geometry of the recess. An example of this approach is described in U.S. Pat. No. 6,357,625 (OWENS-BROCKWAYS PLASTIC PRODUCTS). However, a number of disadvantages arise with the use of such a process which become apparent to the person skilled in the art. Firstly, the operation of trimming excess material is inherently cost ineffective and should thus be avoided. Secondly, any trimming operation requires complete access to the portion that is to be trimmed, thus restricting the recess geometry that may be obtained. Thirdly, such restriction of the recess geometry limits the integration of the closure with the blown article and thus also fails to attain the above stated desired benefits.

It is an objective of the present invention to provide a process for the production of a blow molded article, comprising a recess that integrates, at least with part, of the closure, such that the closure, when coupled with the blown article, may be substantially flush to the apex of the outmost surface of said article.

It is another objective of the present invention to provide a blow molding process forming a recess in the blown article, such that at least a portion of said article wraps around at least a part of a closure when coupled to the blown article.

It is a further objective of the present invention to simplify the de-molding of articles comprising undercuts proximal to the neck portion thereof, whilst preventing damage to the article during such operation.

SUMMARY OF THE INVENTION

The invention is directed to a process for the manufacture of a blow molded article comprising an integral neck portion. Said process comprises the step of forming at least one recess proximal to said neck portion by translation of at least one moving plug relative to a first portion of said article.

BRIEF DESCRIPTION OF THE DRAWINGS

FIG. 1A illustrates an isometric view of a blown article formed by a process according to an embodiment of the present invention.

FIG. 1B illustrates a side view of the blown article of FIG. 1A.

FIG. 1C illustrates an enlargement of section A of FIG. 1B.

FIG. 1D illustrates a top view of the article of FIG. 1B.

DETAILED DESCRIPTION OF THE INVENTION

Figure 1E:
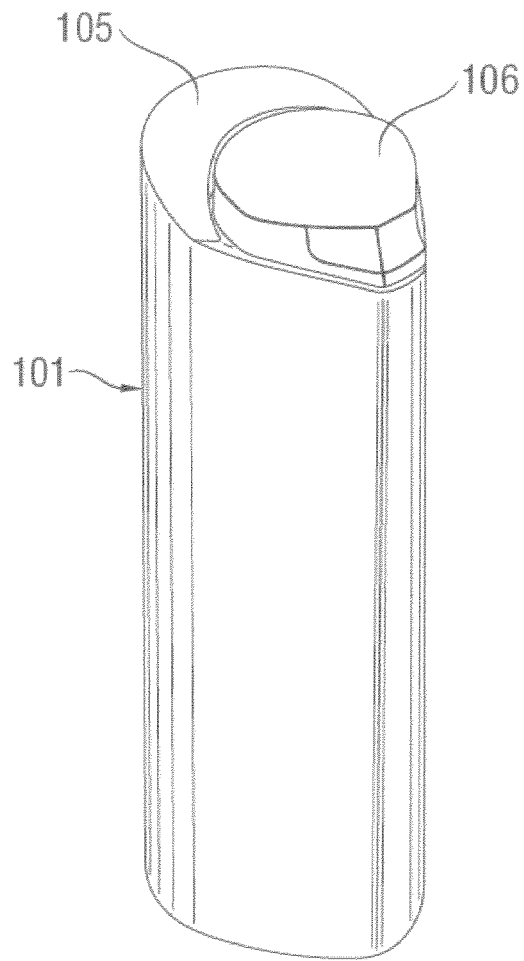
FIG. 1E is an isometric view of a blown article formed by a process according to an embodiment of the present invention coupled to a closure.

The term undercut as used herein means that at least one portion of the molded article, comprises a physical geometry that hinders the removal of the article from the mold when said mold is opened in a direction which intersects at least a portion of said geometry.

The "z-axis" as used herein is the longitudinal axis Z (or centerline of the article).

The "x-y" plane as used herein is the plane substantially perpendicular to the z-axis.

The term "thermoforming" is used herein in its broad sense of deformation of a material at temperature above its glass transition/brittle temperature. Thermoforming is described in "The Wiley Encyclopedia of Packaging Technology", Edited by Brody, A. L. and Marsh, K. S., John Wiley & Sons, Inc., $2^{nd}$ Edition, 1997, pages 914 to 921, which is incorporated herein by reference. Thermoforming is one of many manufacturing processes that converts plastic resin into usable everyday products. Speed and cost efficiency are the highlighted qualities that thermoforming offers which lead the way for the process becoming so important in industry today. The basic concept of thermoforming is quite simple. A pre-manufactured thermoplastic sheet is heated until it becomes soft and pliable. It is then forced against the contours of a mold until it cools to its original state. Once it has cooled it is removed from the mold while still maintaining the shape of the mold. Thermoforming is a broad term; there are many different types of thermoforming processes. For deep thermoforming, bubble plug-assist forming is an important process. The advantage of this forming technique is that it improves material distribution because of its pre-stretching procedure. By this process, it is possible to control the thickness of the formed article as the sheet is stretched to guarantee an even thickness of walls. Once the sheet has been placed in the frame and heated, controlled air pressure creates a bubble (herein after also referred to as a "protruding region"). This bubble stretches the material to a predetermined level. The male plug assist is then lowered, forcing the stretched stock down into the cavity. The male plug is normally heated to avoid chilling the plastics prematurely. The plug is made as large as possible so the plastic is stretched close to the final shape of the finished product. The female mold may be vented to allow trapped air to escape from between the plastics and the mold. Thermoforming can take place in two dimensions, whereby a surface is deformed, or in three dimensions where, in addition to two dimensional deformation, a change of the thickness also occurs.

The term "preform" as used herein is a molded element which is produced prior to expansion to form the finished article. A preform is necessarily somewhat smaller than the finished blown article. A preform is generally produced by, for example injection molding, at an elevated temperature in excess of the melt temperature.

The term "stretch-blow molding" as used herein is the process in which preforms are heated above their glass transition temperature, and then blown in molds using a high pressure medium, preferably air, to form hollow articles, such as containers. Usually the preform is stretched with a stretch rod as part of the process.

As used herein "recycled" materials encompass post-consumer recycled (PCR) materials, post-industrial recycled (PIR) materials, and mixtures thereof.

As used herein "regrind" material is thermoplastic waste material, such as sprues, runners, excess parison material, and reject parts from injection and blow molding and extrusion operations, which has been reclaimed by shredding or granulating.

As used herein the prefix "bio-" is used to designate a material that has been derived from a renewable resource.

The invention is directed to a process for the manufacture of a blow molded article comprising an integral neck portion. Said process comprises the step of forming at least one recess proximal to said neck portion by translation of at least one moving plug relative to a first portion of said article. By "first portion of said article" we herein mean a portion of the article which is substantially opposite said neck portion, preferably the base of said article. By "integral neck portion" it is herein intended that said neck portion is one part with said article.

For the purposes of the present invention, suitable recesses are those that permit a portion of the article to wrap around at least part of a closure, when said closure is coupled with said article. Such recess may allow the closure, when coupled to said article, to remain substantially flush to the apex of the outermost surface of said article. By "at least part of a closure" it is herein intended that said portion extends around the perimeter of the closure to form an angle of at least 45°, preferably at least 60°, more preferable between 60° and 360°, taken from the centre of the closure and in the x-y plane, when said closure is coupled to said article.

The following sections will illustrate the embodiments of the present invention with reference to the drawings. Firstly, the articles made by the process of the present invention and suitable closures will be discussed, followed by a detailed description of the preferred embodiments of the process according to the present invention.

The Article

Articles formed by the process of the present invention may comprise more than one undercut, preferably at least two undercuts, more preferably at least three undercuts, and even more preferably at least four undercuts, proximal to the neck portion thereof. Particularly preferred geometries generating such undercuts are those that comprise at least one curved surface, preferably a concave surface.

Articles made by the process of the present invention may be selected from the group consisting of containers, devices, handles, implements and combinations thereof. Preferred articles are containers for use in a variety of fields. Non-limiting examples of such fields are; beauty care products, such as containers for body wash, shampoos and conditioners; domestic and/or household products, such as containers for detergents or other cleaning preparations for cleaning and/or conditioning fabric and/or hard surfaces; oral care products, such as containers for mouth wash; and so on.

Articles made by the process of the present invention can be made of any suitable plastic resin material. Preferred plastic resin materials for use in the present invention can be polyolefins (such as PP and PE), polystyrene (PS), polyvinyl chloride (PVC), polylactic acid (PLA) or polyethylene terephthalate (PET). In one embodiment, the plastic resin material is polyethylene terephthalate (PET). Alternatively, articles made by the process of the present invention may be made of sustainable materials selected from the group consisting of renewable materials, recycled materials, regrind materials, and mixtures thereof.

Examples of "renewable materials" include bio-polyethylene, bio-polyethylene terephthalate, and bio-polypropylene. As used herein and unless otherwise stated, "polyethylene" encompasses high density polyethylene (HDPE), low density polyethylene (LDPE), linear low density polyethylene (LLDPE), and ultra low density polyethylene (ULDPE). As used herein and unless otherwise stated, "polypropylene" encompasses homopolymer polypropylene, random copolymer polypropylene, and block copolymer polypropylene.

Referring to FIG. 1A-E, said article (101) may be a container comprising an opening (102) defined by a neck portion (103), said neck portion (103) may comprise a top surface (104). At least one portion of the top surface (104) of said neck portion (103) may be below at least one portion of the uppermost surface of said article taken along an axis extending parallel to the centerline (or z-axis) of said article (101). The uppermost portion of said article may be in the form of at least one shoulder (105), preferably said shoulder extends parallel to at least a portion of the perimeter of said neck portion (103) so as to define a recess proximal to said neck portion (103). The recess may be located between said shoulder (105) and said neck portion (103). The advantage of such configuration is that it allows fitting of a closure (106) to be substantially sunk into the blown article. By "sunk into" it is herein intended that at least one surface of said closure (106) remains substantially flush with at least one surface of said article, preferably said at least one surface of said article is on the outer surface of said shoulder (105). Preferably said at least one surface is the uppermost surface taken along a plane substantially parallel to the centerline of said article.

In an embodiment, at least one portion of said recess is substantially concave in shape. This configuration has the advantage of reducing the gap between the closure (106) and the article when the two are coupled together. However, this geometrical complexity results in problematic unmolding using current processes. Indeed, such recesses do not allow unmolding of the article with traditional straight-pull movement during mold opening.

In one embodiment at least part of the interface between the portion of the article (101) wherein said closure (106) is fitted and the portion of the closure (106) in facing relationship thereto, presents a geometry that is selected from the group consisting of concave, convex, linear, non-linear and combinations thereof. Preferably said interface is along at least one surface of said shoulder (105).

In another embodiment, articles made by the process of the present invention may comprise a non-linear geometry proximal to said neck portion (103). The curvature of said non-linear geometry may allow a portion of the article to wrap around at least part of the closure (106), once said closure is fitted onto said article. Preferably said portion of the article wrapping around at least part of the closure (106) is at least one surface of said shoulder (105), more preferably the inner surface (107) of said shoulder (105) facing the neck portion of said article.

In one embodiment, the inner surface (107) of said shoulder (105) may comprise a positive draft angle of less than 10°, preferably less than 8°, more preferably less than 5°. Such draft angle is defined as the angle of a surface taken from a plane perpendicular to the mold parting line formed on said surface. Having a positive draft angle of less than 10° may be important for several reasons including, consumer acceptance and potential re-application of the same closure across a range of article sizes. Without being bound by theory it is believed that the smaller the draft angle, the smaller the space or gap that will exist between the article and the closure after said closure is assembled thereon. Thus achieving a more aesthetically pleasing design and a winning consumer acceptance. Furthermore, having a low positive draft angle on the inner surface (107) of said shoulder (105) enables the utilization of closures with no or low positive draft angles. Closures having a low positive draft angle may then be used with a variety of different shoulder designs and/or with articles not having a shoulder at all. This results in greater flexibility as the same closure may be used across a wide variety of articles thus creating scale, which in turn typically reduces costs and logistic complexity.

In a preferred embodiment, articles made by the process of the present invention may include a closure retention mechanism (108) that can be selected from the group consisting of snap bead, thread, and combinations thereof. Said closure retention mechanism (108) may protrude from at least one section of the perimeter of said neck portion (103), preferably said closure retention mechanism (108) is located proximal to the top surface (104) of said neck portion (103). It will be apparent to the person skilled in the art that such protrusions will further complicate the un-molding of the article. Indeed, such closure retention mechanism (108) will hinder the removal of said article from the mold in a direction substantially perpendicular to the horizontal "x-y" plane.

In one embodiment, said closure retention mechanism (108) may protrude for a distance "a" from a proximal end to a distal end. Typically, said proximal end is closer to the z axis than said distal end. Preferably said distance "a" is taken along a plane substantially perpendicular to said z axis. In one embodiment the distance "a" is less than 3 mm, preferably less than 2 mm, more preferably between 0.5 mm and 2 mm, most preferably between 0.5 mm and 1.5 mm The Closure Closures that may be used with articles made by the process of the present invention are any that are suitable for compliance with said articles.

In one embodiment, the closure (106) may be capable of coupling with said article (101), preferably said closure (106) comprises a coupling means (not shown) that interacts with said closure retention mechanism (108) to secure said closure (106) onto said article (101).

In one embodiment, said closure (106), when coupled to said article, may provide for fluid communication between the interior and exterior of said article via a passage when said closure (106) is in a first position. When said closure (106) is moved to a second position, said passage is blocked and fluid communication is interrupted. Accordingly said closure (106) may be moved from said first position to said second position and vice versa. Preferably the movement from said first position to said second position is selected from the group consisting of translational, rotational and combinations thereof.

The Process

Blow molding is a well known manufacturing process for the fabrication of plastic articles such as containers, fuel tanks, handles etc. The blow molding process begins with melting down plastic and forming it into a parison or preform. The parison is then clamped into a mold and a pressurized medium, usually air, is blown or pumped into it. The air pressure forces the plastic to match the peripheral geometry of the mold. Once the plastic has cooled and hardened the mold opens up and the part is ejected.

There are three main types of blow molding platforms: extrusion blow molding (EBM), injection blow molding (IBM) and stretch blow molding (SBM). In some applications the combination of the abovementioned blow molding platforms may be more appropriate depending on the properties and complexity of the articles to be formed, such as injection stretch blow molding (ISBM).

As in all polymer processes the temperature history plays an important factor in the deformation behavior. For amorphous polymers, such as polystyrene, the forming temperature is generally above the polymer's glass transition temperature ($T_g$). The glass transition temperature is defined as the temperature below which the polymer behaves like a brittle, glassy solid and above which the polymer behaves like a rubber and is easily deformable. For semi-crystalline polymers, the amorphous region responds to temperature just like an amorphous polymer described above, but the crystalline region that is composed of crystallite structure requires more heat energy to unravel/shear the crystallite molecules and enable large deformation as needed for the formation of the recess. The percentage of crystallinity and the rate of crystallization depend strongly on the crystallization temperature, the time at that temperature, and the degree of molecular orientation during crystallization. Typically, semi-crystalline materials are deformed close to the melt temperature $T_m$. The melt temperature is the temperature where all crystallites are melted and the polymer is behaving as a fluid. Another characteristic temperature for semi-crystalline polymers is the re-crystallization temperature $T_c$. The re-crystallisation temperature is defined as the temperature at which an un-oriented polymer when cooled down from the melt is showing significant crystal growth within a specific period of time, typically a few minutes. As crystal growth is slower at lower temperatures, if the specified time period is extended, the $T_c$ effectively drops.

Glass transition temperature, re-crystallisation temperature and melt temperature may be conveniently measured with reference to ASTM D3418.

As illustrative example of above, an isotactic random co-polymer polypropylene grade typically used for reheat stretch-blow molding of containers shows a 1-3 minutes crystallization inhibition time before crystal growth initiates at 60-80° C. Hence, if the time period for crystallisation is set at 1 minute, 60-80° C. is effectively below $T_e$ even when the polymer was stretched biaxially at temperatures close to the melt temperature. PET is known to show stress-induced crystallization during stretch-blow molding up to a crystallinity of 20-25%. If the polymer is then cooled down rapidly to temperatures below $T_g$ no additional crystallinity will develop. But if kept at temperatures above 90° C. ($T_c$) the polymer will crystallize up to 35% within minutes. At temperatures between $T_g$ and $T_c$ there is little or no further crystal growth within the first 1-2 minutes which may be advantageous in some instances.

| Typical Temperatures | PET | PP | PS | HDPE |
|---|---|---|---|---|
| Glass transition temperature, $T_g$ | 81° C. | −10° C. | 82° C. | −100° C. |
| Recrystallisation temperature, $T_c$ (for time <1 min) | 90° C. | 110° C. | Not applicable (fully amorphous) | 123° C. |
| Melt temperature, $T_m$ | 265° C. | 170° C. | 240° C. | 135° C. |

In an embodiment of the present invention a heated preform may be inserted into a blow mold cavity. This blow mold may comprise a geometry on the outer walls of the cavity to create the pre-stretched bubble (or protruding region) that will later be thermoformed by the plug(s). The container may then be stretch-blown in such a way that the pre-stretched bubble is cooled as little as possible. This ensures that minimal or no additional heat is needed to be applied to the bubble in the second thermoforming process step.

Figure 2A:
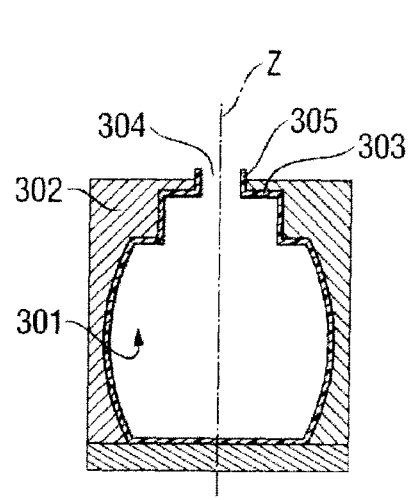
FIG. 2A-D illustrate a process according to an embodiment of the present invention
Figure 2B:
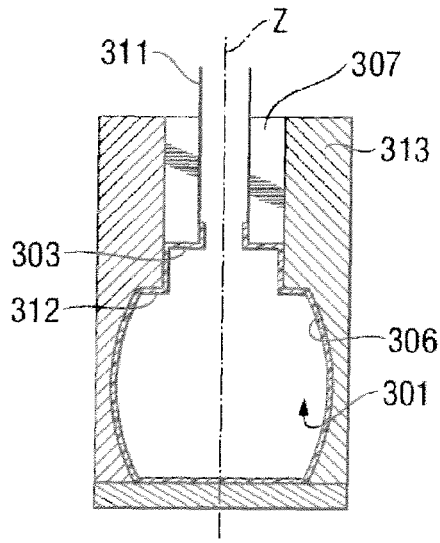
Figure 2C:
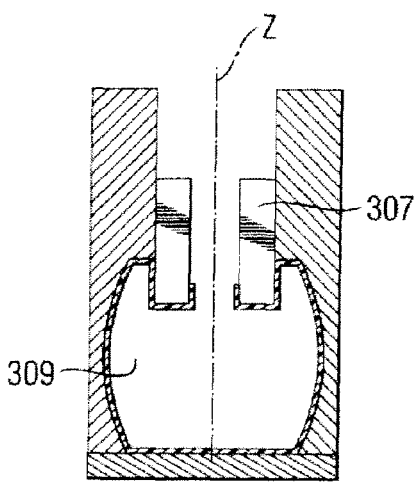
Figure 2D:
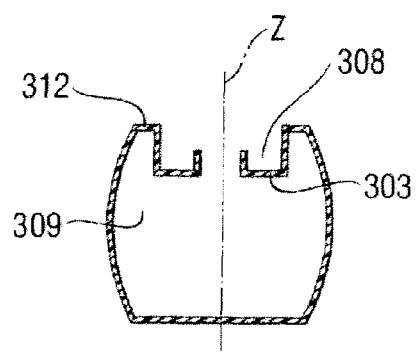

A preferred embodiment of the process according to the present invention can be well understood with reference to FIG. 2A-D showing the steps of:
a) Blowing an intermediate article (301) in a mold cavity (302), preferably with a protruding region(s) (303) in the proximity of the opening (304) defined by a neck portion (305) of the article, FIG. 2A;
b) Optionally placing said intermediate article (301) in a secondary mold cavity (306), FIG. 2B;
c) Applying one or more moving plug(s) (307) to form one or more recesses (308), preferably the protruding regions are recessed by means of said inward moving plug(s) (307), whilst maintaining a pressure inside the intermediate blown article (301) of at least 1 bar, FIG. 2B-C;
d) Releasing the excess pressure within the blown article (309), preferably prior to withdrawing the plug(s) (307); and
e) Ejecting the finished blown article (309) from said secondary mold cavity (306) FIG. 2D.

The step shown in FIG. 2A can be done with any of the main types of blow molding platforms, or combination thereof. In one embodiment said molding platform is injection stretch blow molding (ISBM) where an injected preform is placed into a mold cavity and stretch-blow molded into an intermediate article (301) with a protruding neck portion (305). In another embodiment the molding platform may be extrusion blow molding (EBM) wherein an extruded parison may be blown to form a blown article comprising a protruding neck portion (305), and preferably additionally comprising at least one closure retention mechanism.

The step shown in FIG. 2A-C may be done in the same mold cavity straight after the blow molding of the intermediate article (i.e. with no need of a secondary mold cavity). If done in the same cavity, this has the advantage that the time between blow molding and recessing the protruding region (303) is minimized Another advantage is that the tolerances on the final article specifically around the neck are very tight as there is no relative movement of the blown article versus said plug(s) (307).

In a variation, the intermediate article (301) may be moved to a secondary mold cavity (306) that is different to the mold cavity (302) where the intermediate article (301) is blown. If done in a separate mold cavity, the blown intermediate article (301) may be re-heated just before placing in the secondary mold cavity (306). A reheating step may be done in case the region proximal to the neck portion (305) has cooled down too much during the blowing step, the transfer and/or the storage time of the intermediate article (301). In a preferred embodiment the intermediate blown article may be transferred into a secondary mold cavity (306) right after blow molding.

In the step shown in FIG. 2B-C, the intermediate article may be pressurized to enable a positive location of the article in the secondary mold cavity (306), preferably said plug(s) (307) is/are forced into the protruding region (303) proximal to said neck portion (305) of the blown article, more preferably said plug(s) (307) is/are in the form of at least one plug-assist piston, even more preferably said plug(s) (307) is/are at least one segment of the blow nozzle (311) and may be located within said blow nozzle (311) and or on the outside of the perimeter of said blow nozzle (311). As result, the protruding region (303) may be recessed against the shoulder (s) (312) of the blown article (309). As the male portion of the plug(s) fully engages with said article, an over pressure from 1 to 20 bar, preferably from 1 to 5 bar, may be applied to calibrate the geometry of the final blown article against the female part of the secondary mold cavity (306). This pressure inside the blown article may fulfill different functions. Firstly, it may press the article to the cool secondary mold cavity (306) walls, which essentially functions as a secondary cooling cycle after the blowing. This may prevent panel and base deformation in the final article specifically if a hot secondary mold (313) is being employed. Pressures above 5 bar may be needed to avoid unwanted deformation in the final article. Higher pressures have been found to be beneficial as they aid the avoidance of local deformations near the region which is recessed during movement of the plug(s) (307). These deformations are usually caused by the radial tension and tangential compression stresses in that region. Finally, the pressure inside the article also acts as a female hydrostatic die that shapes the plastic to the metal skin (or outer surface) of the plug(s) (307) as it progressively moves towards the inside of said secondary mold cavity (306). Once the male plug(s) (307) are fully engaged, plastic may be conformed to the plug(s) and the final recess geometry is achieved. In a preferred embodiment, the outer profile of said moving plug(s) (307) may correspond to the interior profile of said at least one recess (308), preferably said at least one recess (308) comprises at least one concave portion.

In the step shown in FIG. 2C-D, the excess pressure inside the blown article may be vented and the plug(s) (307) removed, preferably before the final blown article (309) is ejected.

In a preferred embodiment, the step shown in FIG. 2B-C is carried out whilst the temperature of the material in the region proximal to said neck portion (305) of said intermediate article (301) is maintained at a temperature below the glass transition temperature, $T_g$. It is particularly preferable that such temperature regime is maintained for articles made of polyethylene terephthalate (PET). In another embodiment said temperature is maintained between the glass transition temperature, Tg, and the melt temperature, Tm. Preferably such temperature regime is maintained for articles made of polyolefins (such as PP and PE).

EXAMPLES

A standard PET resin (Equipolymer C93, IV=0.80 dl/g) perform is stretch-blow molded at a mold temperature of 65° C. An intermediate article is blown with a 360 degree protruding neck. The intermediate article is ejected from the blow mold cavity and presented to a secondary cavity. A male plug is used to recess the neck. The final article has a neck with a 360 degree shoulder profile and the neck is recessed by 15 mm—measured from "x-y" plane of the uppermost portion of the protruding shoulders to the "x-y" plane of the base of the neck. A round closure is capped onto the final article with the effect that the closure is substantially sunk into the blown article shape.

A study of different protruding shape geometries has been conducted to identify the most favorable geometry. The most favorable geometry is the geometry that eliminates any unwanted distortion during the operation of recessing the neck in the region nearby the recessed neck. It has been found that geometries with a small radius at the base of the neck help to initiate the deformation and specifically straight wall sections in the intermediate protruding neck are best to control the deformation during the movement of the plug.

As the shape deformation needed to recess the neck is a combination of material bending, reverting and stretching, the forces encountered during the deformation are critically dependent on the material distribution in the protruding region and the final intended shape geometry. A specific preform has been developed to obtain the desired homogeneous material distribution in the protruding neck region. It has been found that non-cylindrical recess shapes can be equally obtained to cylindrical recess shapes, yet deformations in the regions nearby the recess area are more difficult to avoid.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention

What is claimed is:

1. A process for the manufacture of a blow molded article (309) comprising an integral neck portion (305) characterized in that said process comprises the step of forming at least one recess (308) proximal to said neck portion (305) by translation of at least one moving plug (307) relative to a first portion of said article wherein said moving plug(s) (307) is at least one segment of a blow nozzle (311), and wherein said segment is located on the outer surface of at least a portion of the perimeter of said blow nozzle (311).

2. A process according to claim 1 wherein said process is selected from the group consisting of extrusion blow molding, injection blow molding, injection stretch blow molding, and combinations thereof.

3. A process according to claim 1 wherein said article (309) comprises more than one undercut proximal to said neck portion (305).

4. A process according to claim 1 wherein the outer profile of said at least one moving plug (307) corresponds to the interior profile of said at least one recess (308), preferably said at least one recess (308) comprises at least one concave portion.

5. A process according to claim 1 comprising the steps of:
   (i) Blowing an intermediate article (301) in a mold cavity (302), preferably forming at least one protruding region (303) proximal to said neck portion (305);
   (ii) Placing said intermediate article (301) in a secondary mold cavity (306);
   (iii) Closing said secondary mold cavity (306);
   (iv) Applying one or more moving plug(s) (307) to form one or more recess(es) (308) whilst maintaining the pressure within said intermediate container (301) above 1bar;
   (v) Releasing excess pressure within the blown article (309), preferably prior to withdrawing the at least one plug (307); and
   (vi) Ejecting the blown article (309).

6. A process according to claim 5 wherein said intermediate article (301) is formed by a process selected from extrusion blow molding (EBM) and injection stretch blow molding (ISBM), preferably injection stretch blow molding (ISBM).

7. A process according to claim 5 wherein said intermediate article (301) comprises least one protruding region (303) proximal to said neck portion (305), and wherein step (iv) comprises the step of recessing said at least one protruding region (303) by means of said plug(s) (307).

8. A process according to claim 5 wherein step (iv) is carried out whilst the temperature of the material in the region proximal to said neck portion (305) of said intermediate article (301) is maintained at a temperature below the glass transition temperature, $T_g$.

9. A process according to claim 5 wherein step (iv) is carried out whilst the temperature of the material in the region proximal to said neck portion (305) of said intermediate article (301) is maintained at a temperature of between the glass transition temperature, Tg, and the melt temperature, Tm.

10. A process according to claim 5 wherein said article is made from polyethylene terephthalate (PET).

11. A process according to claim 5 wherein said article is made from polyolefins, preferably polypropylene (PP) and/or polyethylene (PE).

12. A process according to claims 5 wherein the internal pressure of said intermediate article (301) in step (iv) is maintained between 1 bar and 5 bar.

13. A process according to claims 5 wherein following shaping of the recess (308) by said moving plug(s) (307) in step (iv), the internal pressure of said intermediate article (301) is increased to greater than 5 bar.

14. A process according to claim 5 wherein said secondary mold cavity (306) and said mold cavity (302) are the same mold, and wherein steps (ii) and (iii) are not performed.

\* \* \* \* \*